(12) United States Patent
Freese et al.

(10) Patent No.: US 8,725,996 B2
(45) Date of Patent: May 13, 2014

(54) BOOT MODE

(75) Inventors: Timothy J. Freese, Niwot, CO (US); Fletcher Liverance, Kent, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 12/787,976

(22) Filed: May 26, 2010

(65) Prior Publication Data

US 2011/0296152 A1    Dec. 1, 2011

(51) Int. Cl.
  *G06F 15/177*    (2006.01)
(52) U.S. Cl.
  USPC ................ 713/2; 713/1; 710/5; 717/168
(58) Field of Classification Search
  USPC .................. 713/1, 2; 710/5; 717/168
  See application file for complete search history.

(56) References Cited

U.S. PATENT DOCUMENTS

| | | | | |
|---|---|---|---|---|
| 6,477,482 | B1 * | 11/2002 | Maupin et al. | 702/183 |
| 6,507,906 | B1 * | 1/2003 | Criddle et al. | 713/2 |
| 7,650,147 | B2 | 1/2010 | Hawkins et al. | |
| 7,774,633 | B1 * | 8/2010 | Harrenstien et al. | 713/323 |
| 8,046,575 | B2 * | 10/2011 | Lin et al. | 713/2 |
| 2010/0241843 | A1 * | 9/2010 | Yokoyama | 713/100 |

\* cited by examiner

*Primary Examiner* — Thuan Du
(74) *Attorney, Agent, or Firm* — Chun-Liang Kuo (57) ABSTRACT

A method for launching a boot mode of a device including detecting an input in response to a user accessing a power button of the device, identifying at least one characteristic of the input and a corresponding boot mode which can be launched in response to at least one of the characteristic of the input, and configuring the device to launch the corresponding boot mode.

20 Claims, 7 Drawing Sheets

BOOT MODE

BACKGROUND

When a device launches a boot mode, a user can turn on the device and the device can proceed to automatically select and load a boot mode of the device. Additionally, the user can access a keyboard of the device and proceed to enter one or more commands for the device to process when selecting and loading a boot mode. Once a boot mode has been selected, the device can proceed to load and process the selected boot mode of the device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

Figure 1:
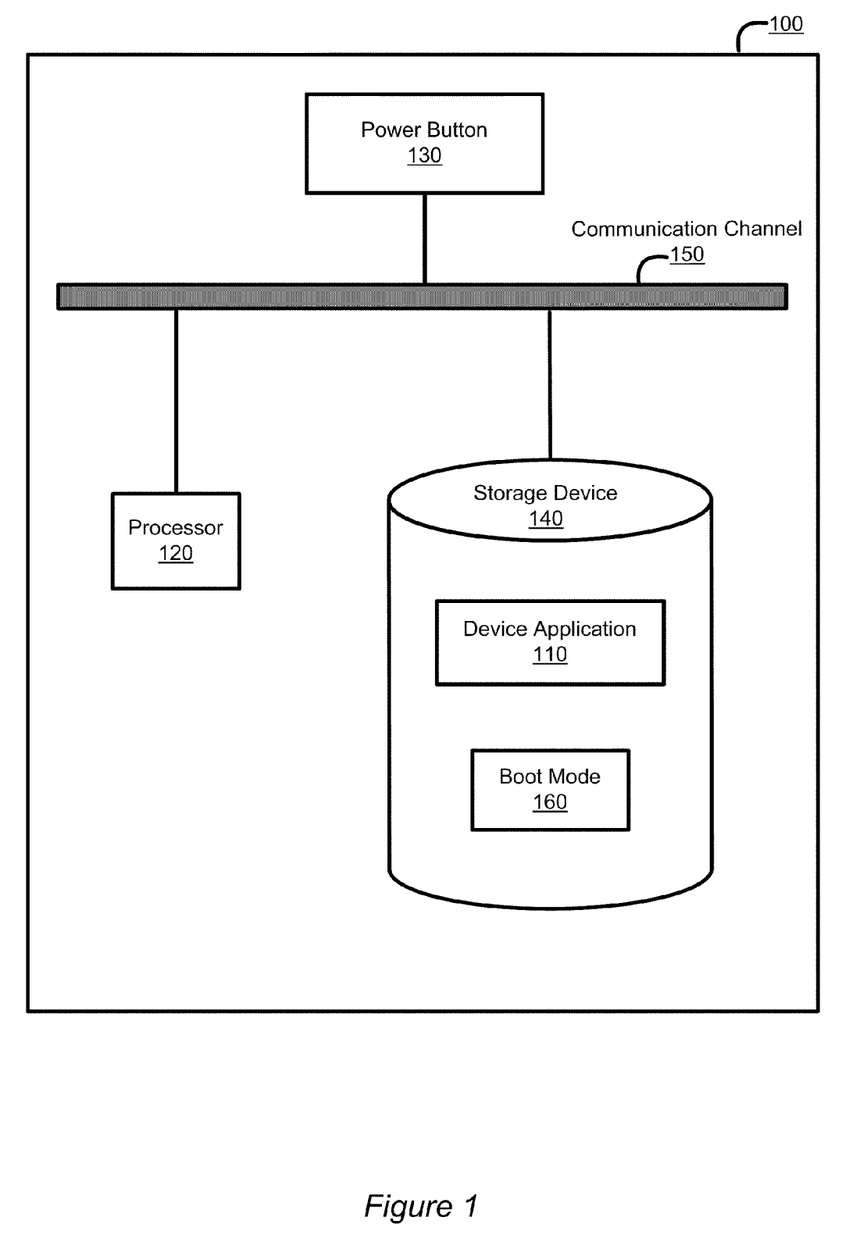
FIG. 1 illustrates a device with a power button and a boot mode according to an embodiment of the invention.

FIG. 1 illustrates a device 100 with a power button 130 and a boot mode 160 according to an embodiment of the invention. In one embodiment, the device 100 is a desktop, a laptop, a server, and/or any computing device which includes a power button 130 and one or more boot modes 160. In another embodiment, the device 100 is a PDA, a cellular device, and/or any portable device which can include a power button 130 and one or more boot modes 160.

As illustrated in FIG. 1, the device 100 includes a processor 120, a power button 130, a storage device 140, and a communication bus 150 for the device 100 and/or one or more components of the device 100 to communicate with one another. Additionally, as shown in FIG. 1, the storage device 140 includes a device application 110 and one or more boot modes 160. In other embodiments, the device 100 includes additional components and/or is coupled to additional components in addition to and/or in lieu of those noted above and illustrated in FIG. 1.

As noted above, the device 100 includes a processor 120. The processor 120 sends data and/or instructions to the components of the device 100, such as the power button 130 and the device application 110. Additionally, the processor 120 receives data and/or instruction from components of the device 100, such as the power button 130 and the device application 110.

For the purposes of this application, the power button 130 is a component of the device 100 which can operate as a switch or an input device in response to a user accessing the power button 130. Additionally, a user can access the power button 130 by touching and/or pressing the power button 130 one or more times. In response to the user accessing the power button 130, the device application 110 can launch a boot mode 160 of the device 100.

The device application 110 is an application which can receive one or more instructions from the processor 120 to detect an input for the device 100 in response to a user accessing the power button 130. Additionally, the device application 110 can identify at least one characteristic of the input and a corresponding boot mode 160 which can be launched in response to at least one of the characteristics of the input. In response to identifying a corresponding boot mode 160, the device application 110 can configure the device 100 to launch the corresponding boot mode 160.

In one embodiment, the device application 110 is a boot loader configured to select a boot mode 160 to launch from the storage device 140 of the device 100. The device application 110 can be firmware which is embedded onto the device 100 and/or the storage device 140. In another embodiment, the device application 110 is a software application stored on the device 100 within ROM or on the storage device 140 accessible by the device 100. In other embodiments, the device application 110 is stored on a computer readable medium readable and accessible by the device 100 or the storage device 140 from a different location.

Additionally, in one embodiment, the storage device 140 is included in the device 100. In other embodiments, the storage device 140 is not included in the device 100, but is accessible to the device 100 utilizing a network interface included in the device 100. The network interface can be a wired or wireless network interface card. In other embodiments, the storage device 140 can be configured to couple to one or more ports or interfaces on the device 100 wirelessly or through a wired connection.

In a further embodiment, the device application 110 is stored and/or accessed through a server coupled through a local area network or a wide area network. The device application 110 communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

As noted above, the device application 110 is an application which can detect an input for the device 100 in response to a user accessing a power button 130 of the device 100. Additionally, as noted above, the power button 130 is a component of the device 100 which can operate as a switch or an input device for the device 100. In one embodiment, the power button 130 is a touch sensitive device which a user can access through one or more touches. In another embodiment, the power button 130 includes a button or switch which can be triggered in response to a user pressing or depressing the power button 130.

The power button 130 can be coupled to and accessed from one or more locations on the device 100. Additionally, as illustrated in FIG. 1, the power button 130 is coupled to the communication channel 150 and can communicate with the device application 110 and one or more components of the device 100 through the communication channel 150. In response to a user accessing the power button 130, one or more signals can be sent through the communication channel 150.

The device application 110 can detect one or more signals from the power button 130 by scanning the communication channel 150. In one embodiment, in response to detecting one or more signals, the device 100 can initially be power on. Once the device 100 has been power on, the device application 110 will identify any detected signals from the power button 130 as one or more inputs. As a result, the device application 110 detects one or more inputs for the device 100 in response to a user accessing the power button 130 of the device 100. For the purposes of this application, an input can include one or more accesses of the power button 130 by the user.

Once the device application 110 has detected one or more inputs, the device application 110 will proceed to identify one or more characteristics of the input. One or more characteristics of an input can include a number of times which the power button 130 was accessed by the user. Additionally, one or more characteristics of an input can include a duration of time which the power button 130 was being accessed by the user. Further, one or more characteristics of an input can include a duration of time between one or more accesses of the power button 130 by the user. In other embodiments, one or more characteristics of an input can include additional details of the input in addition to and/or in lieu of those noted above.

When identifying one or more characteristics of an input, the processor 120 can send an instruction to the device application 110 to access the communication channel 150 and scan for signals from the power button 130. Additionally, the device application 110 can scan the communication channel 150 and identify a number of signals from the power button 130, a duration of the signals, and a duration between one or more of the signals. Utilizing the number of signals, a duration of the signals, and/or a duration between one or more of the signals, the device application can identify at least one characteristic of the input.

Utilizing at least one characteristics of the input, the device application 110 will proceed to identify a corresponding boot mode 160 which can be launched on the device 100. For the purposes of this application, a boot mode 160 is a mode of operation for the device 100 which controls the device 100 and can be launched on the device 100. In one embodiment, the boot mode 160 includes a BIOS of the device 100. In another embodiment, the boot mode 160 includes a firmware update mode of the device 100. In other embodiments, the boot mode 160 includes a diagnostic mode of the device 100. The boot mode 160 can include additional modes of operation for the device 100 in addition to and/or in lieu of those noted above.

As illustrated in FIG. 1, one or more boot modes 160 can be stored and launched as a ROM from the storage device 140. One or more boot modes 160 can be stored as one or more images and/or files accessible to the device application 110. Additionally, one or more boot modes 160 can be stored and accessed by the device application 110 from a removable storage medium coupled to the device 100. In another embodiment, one or more boot modes 160 can be stored and accessed remotely by the device application 110 through a network interface of the device 100. In other embodiments, one or more of the boot modes 160 can be stored and accessed by the device application 110 from additional locations in addition to and/or in lieu of those noted above.

When identifying a corresponding boot mode 160 to load, the device application 110 can access one or more of the boot modes 160 and scan for characteristics associated with the corresponding boot modes 160. The characteristics can specify under what conditions a corresponding boot mode 160 will be launched. In one embodiment, the characteristics specify for the power button 130 to be accessed a predefined number of times. In another embodiment, the characteristics specify for the power button 130 to be accessed for a predefined period of time. In other embodiments, the characteristics specify for a predefined period of time to elapse between one or more accesses of the power button 130.

The device application 110 will scan the boot modes 160 for a corresponding boot mode 160 which includes characteristics which match the identified characteristics of one or more inputs from the user. Once a match has been found, the processor 120 will send one or more instructions for device application 110 to load the corresponding boot mode 160 with the matching characteristics onto the device 100 for use. In one embodiment, when loading the corresponding boot mode 160, the device application 110 loads the corresponding boot mode 160 as a ROM for the device 100.

Once the corresponding boot mode 160 has been loaded, the device application 110 can continue to scan the communication channel 150 for signals from the power button 130 in response to a user accessing the power button 130. The device application 110 can then identify the signals as inputs and identify characteristics of the inputs. In response to the characteristics of the input, the device application 110 can identify one or more corresponding commands which can be executed while the device 100 is in the loaded boot mode 160. In another embodiment, in response to the characteristics of the input, the device application 110 can select and load another corresponding boot mode 160 onto the device 100.

Figure 2:
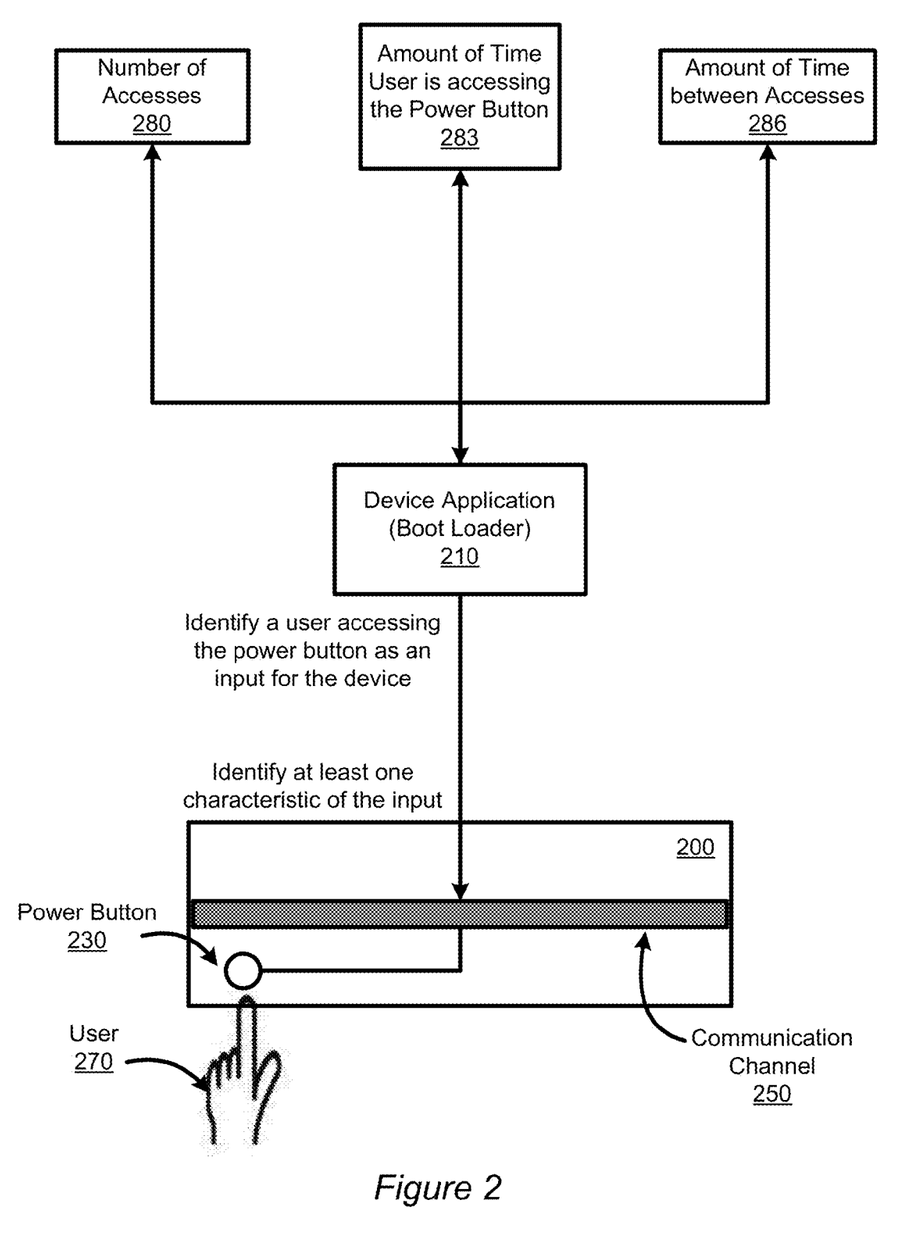
FIG. 2 illustrates a user accessing a power button of a device and a device application identifying at least one characteristic of an input of the power button according to an embodiment of the invention.

FIG. 2 illustrates a user 270 accessing a power button 230 of a device 200 and a device application 210 identifying at least one characteristic of an input of the power button 230 according to an embodiment of the invention. As shown in the present embodiment, a user 270 can be anyone who can access the power button 230 by touching and/or pressing the power button 230. Additionally, the power button 230 can be a component of the device 200 which can be integrated or coupled to one or more locations on the device 200. As shown in FIG. 2, in one embodiment, the power button 230 can be located on an exterior of the device 200 and can be coupled to a communication channel 250 of the device 200. In other embodiments, the power button 230 can be located on additional locations of the device 200 in addition to and/or in lieu of those noted above and illustrated in FIG. 2.

As noted above, the device 200 includes a device application 210 which can operate as a boot loader for the device 200. The device application 210 identifies a user 270 accessing the power button 230 as an input for the device 200. As shown in the present embodiment, when detecting an input, the device application 210 accesses the communication channel 250 and scans for one or more signals from the power button 230. One or more signals are generated by the power button 230 and travel through the communication channel 250 in response to the user 270 touching, pressing, and/or depressing the power button 230.

Once the device application 210 has detected one or more signals from the power button 230, the device application 210 will identify the signals as one or more inputs for the device 200. The device application 210 will then attempt to identify one or more characteristics of the input. As shown in FIG. 2, when identifying one or more characteristics of the inputs, the device application 210 can identify a number of times 280 the power button 230 was accessed by the user 270. Additionally, the device application 210 can identify an amount of time 283 which the user 270 continues to access the power button 230.

The amount of time 283 which the user 270 continues to access the power button 270 can include the duration of a single access of the power button 230 by the user 270 or the duration of a plurality of accesses of the power button 230 by the user 270. Further, the device application 210 can additionally detect and identify an amount of time which has elapsed 286 between one or more accesses of the power button 230.

In one embodiment, the device application 210 can identify a number of accesses 280, an amount of time the user is accessing the power button 283, and/or an amount of time between one or more accesses 286 by scanning the communication channel 250 and identifying a number of signals from the power button 230, a duration of the signals, and/or an amount of time between one or more of the signals. Utilizing at least one characteristic of the input, the device application 210 will attempt to identify a corresponding boot mode to load which has characteristics that match the identified characteristics of the input. In one embodiment, at least one of the characteristic of the input can be utilized by the device application 210 to identify a location of a boot mode.

Figure 3:
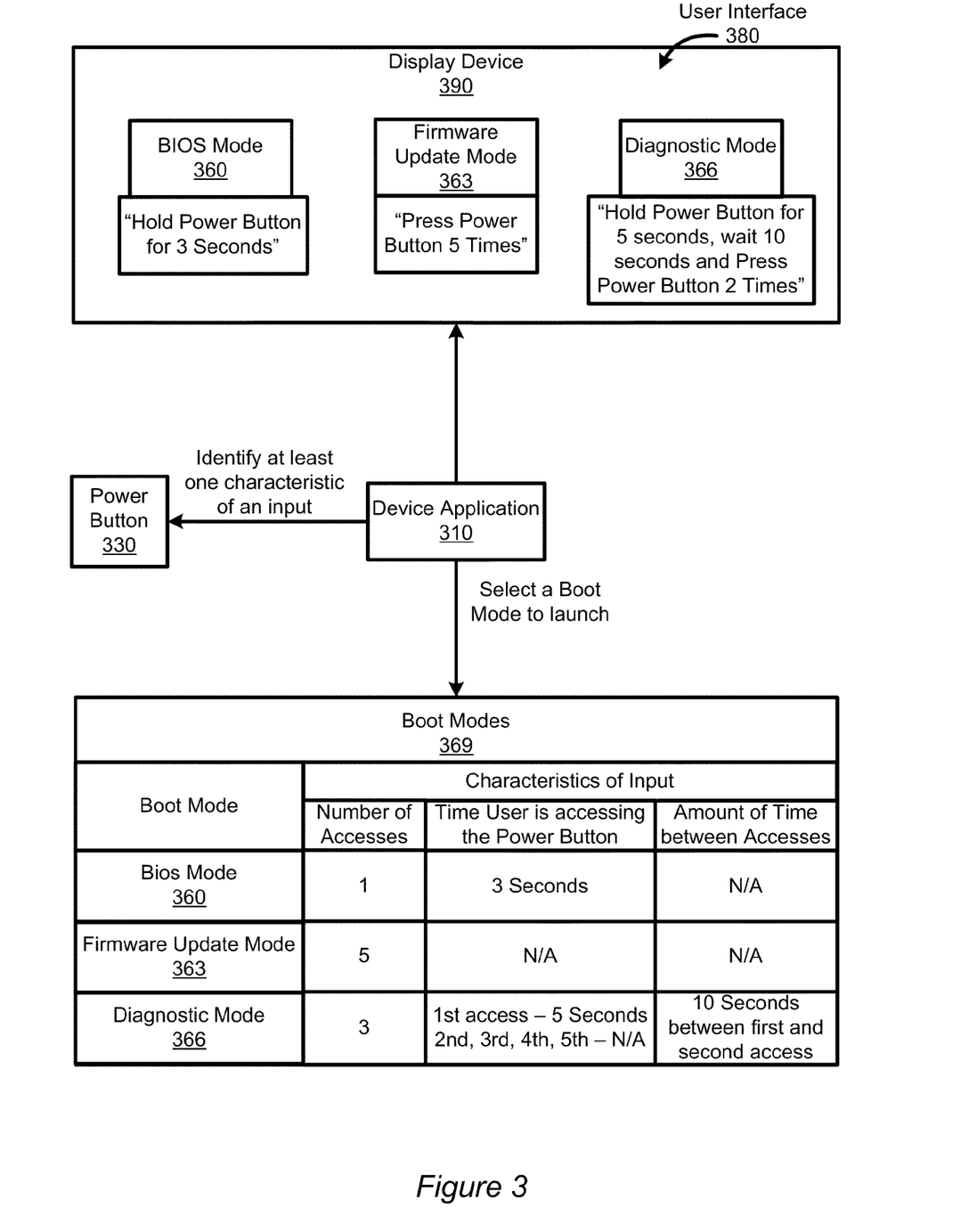
FIG. 3 illustrates a device application utilizing at least one characteristic of an input of a power button to select a boot mode according to an embodiment of the invention.

FIG. 3 illustrates a device application 310 utilizing at least one characteristic of an input of a power button 330 to select a boot mode according to an embodiment of the invention. As noted above, the device application 310 can access one or more boot modes which can be loaded or launched for use onto a device. As shown in FIG. 3, one or more of the boot modes can include a Bios Mode 360, a Firmware Update mode 363, and/or a Diagnostic Mode 366. In other embodiments, additional boot modes can accessed by the device application 310 in addition to and/or in lieu of those noted above.

As noted above, when determining which of the boot modes to select and load for the device, the device application 310 initially identifies at least one characteristic of an input in response to a user accessing the power button 330. The device application 310 will then scan listed characteristics of the available boot modes to determine whether any of the boot modes have characteristics which match the detected and identified characteristics of the input.

In one embodiment, the available boot modes and their corresponding characteristics can be listed as a file or a database of boot modes 369. As shown in the present embodiment, the characteristics for accessing and loading the BIOS mode 360 specifies for the power button 330 to be accessed once for a duration of 3 seconds. Additionally, the characteristics for accessing and loading the firmware update mode 363 specifies for the power button 330 to be accessed 5 times. Further, the characteristics for accessing and loading the diagnostic mode 366 specifies for the power button 330 to be accessed a total of 3 times. In addition, the first access is to last a total of 5 seconds and there is to be a 10 second gap between the first and second access.

If a matching boot mode is found, the device application 310 will proceed to access the matching boot mode and load the matching boot mode for use on the device. In one embodiment, as illustrated in FIG. 3, the device application 310 can additionally access a display device 390 and configure the display device 390 to render a user interface 380 for a user to interact with. A display device 390 is a device that can be configured to display or project one or more images or videos. In one embodiment, the display device 390 is a monitor or television. In other embodiments, the display device 390 is a projector.

Additionally, the display device 390 can be coupled to or integrated as part of the device. As shown in FIG. 3, the display device 390 can render the user interface 380 to list one or more of the available boot modes which can be launched for the device. Additionally, the user interface 380 can include instructions next to each boot mode specifying the characteristics of the boot mode and how a user can load or launch the boot modes in response to accessing the power button 330.

In one embodiment, in response to the viewing the user interface 380, the user proceeds to access the power button 330 a single time for a duration of 3 seconds. Additionally, the device application 310 has detected a signal in the communication channel of the device and determines that there is one signal and the signal lasts for 3 seconds. As a result, the device application 310 determines that an input has been entered and the input has characteristics of a single access for a duration of 3 seconds. The device application 310 then accesses the available boot modes 369 and determines that the characteristics of the input match the BIOS Mode 360. In response the device application 310 proceeds to access the BIOS Mode 360 and launches the BIOS Mode 360 for the device.

Figure 4:
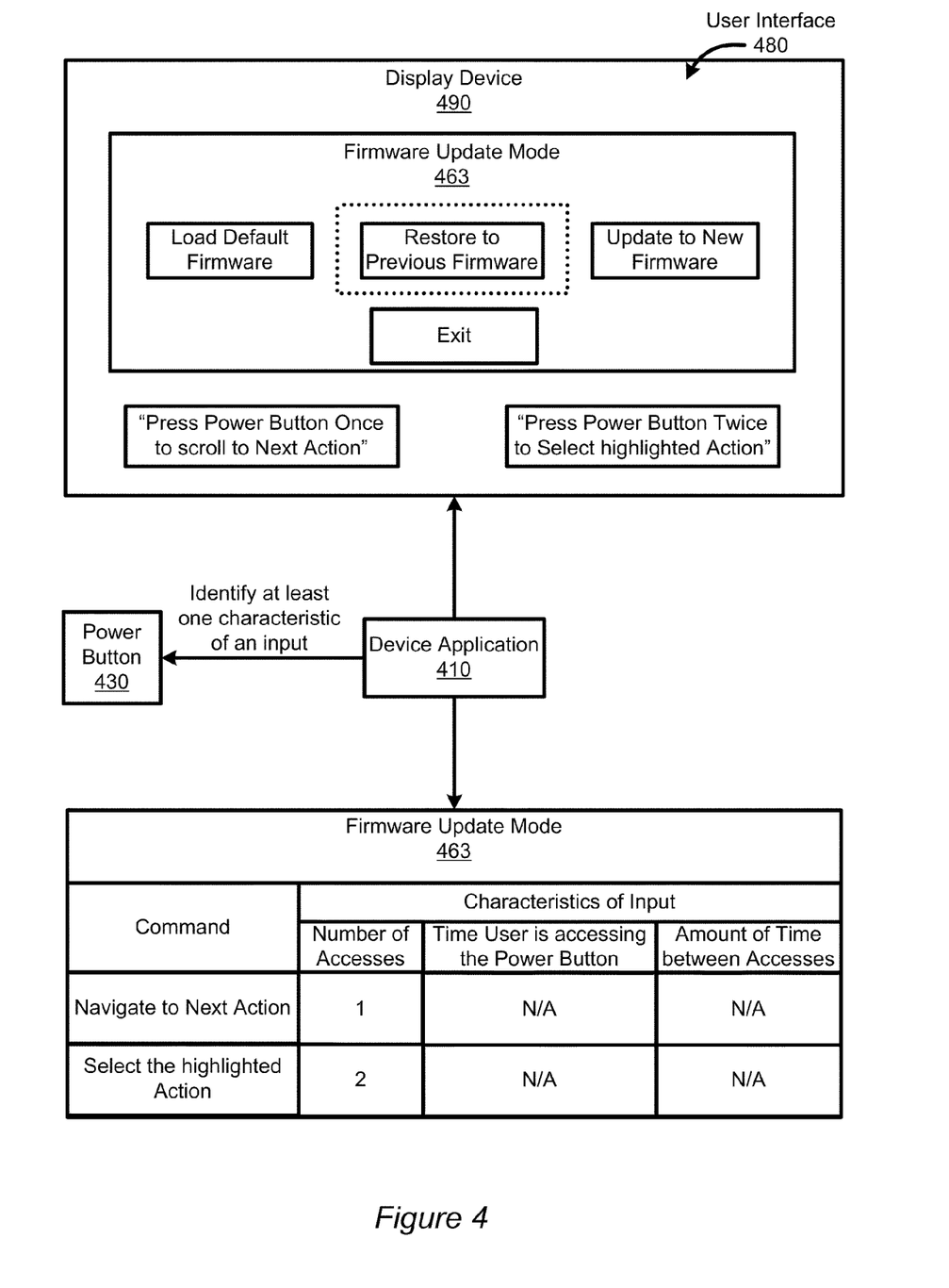
FIG. 4 illustrates a device application utilizing at least one characteristic of an input of a power button to navigate through a boot mode according to an embodiment of the invention.

FIG. 4 illustrates a device application 410 utilizing at least one characteristic of an input of a power button 430 to navigate through a boot mode 463 according to an embodiment of the invention. As illustrated in the present embodiment, a firmware update mode 463 has been selected and loaded onto the device. In one embodiment, the device application 410 additionally configures a display device 490 to render a user interface 480 for the user to interact with while in the loaded firmware update mode 463. The user interface 480 can display one or more actionable items which can be executed while in the firmware update mode 463.

As shown in the present embodiment, one or more actionable items can include an instruction to "load a default firmware," "restore to a previous firmware," "update to a new firmware," and/or to "exit" the user interface 480. Further, the user interface 480 can display instructions for how the user can navigate to and select an actionable command. As shown in FIG. 4, the instructions specify for the user to "press the power button once to scroll to the next action" and for the user to "press the power button twice to select a highlighted action." In other embodiments, the user interface 480 can display additional actionable items and/or instructions in addition to and/or in lieu of those noted above and illustrated in FIG. 4.

In one embodiment, while the user interface 480 is being rendered, the device application 410 scans a communication channel for an input from the power button 430 and identifies at least one characteristics of the input. In addition, once a boot mode has been loaded, the device application 410 can access one or more executable commands while in the loaded boot mode.

As shown in the present embodiment, in response to identifying one or more of the characteristics of an input, the device application 410 can allow the user to navigate between one or more of the actionable items. Additionally, the device application 410 can enable the user to select one or more of the actionable items to execute while in the firmware update mode 463. In other embodiments, one or more of the actionable items while in the loaded boot mode can include an option to select and launch another boot mode for the device.

When differentiating between one or more inputs or commands, the device application 410 can establish a time limit between one or more accesses of the power button. The time limit can be defined by the device application 410, the device, and/or by a user. Additionally, the time limit can be applied by the device application 410 once an access of the power button 430 has been detected. In another embodiment, the time limit can be applied once an input has been identified and a corresponding command or instruction has been executed.

Figure 5:
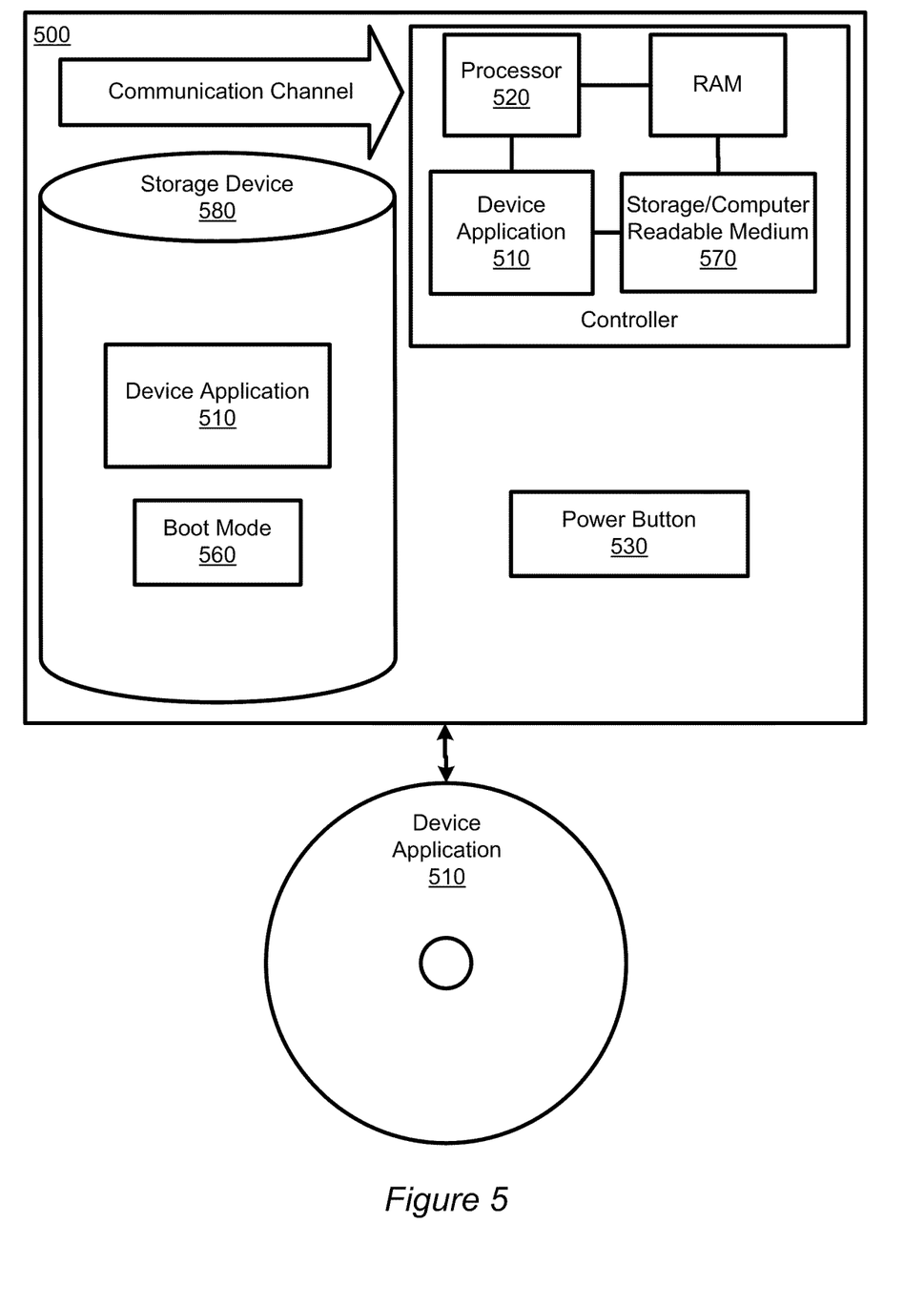
FIG. 5 illustrates a device with an embedded device application and a device application stored on a removable medium being accessed by the device according to an embodiment of the invention.

FIG. 5 illustrates a device 500 with an embedded device application 510 and a device application 510 stored on a removable medium being accessed by the device 500 according to an embodiment of the invention. For the purposes of this description, a removable medium is any tangible apparatus that contains, stores, communicates, or transports the application for use by or in connection with the device 500. As noted above, in one embodiment, the device application 510 is firmware that is embedded into one or more components of the device 500 as ROM. In other embodiments, the device application 510 is a software application which is stored and accessed from a hard drive, a compact disc, a flash disk, a network drive or any other form of computer readable medium that is coupled to the device 500.

Figure 6:
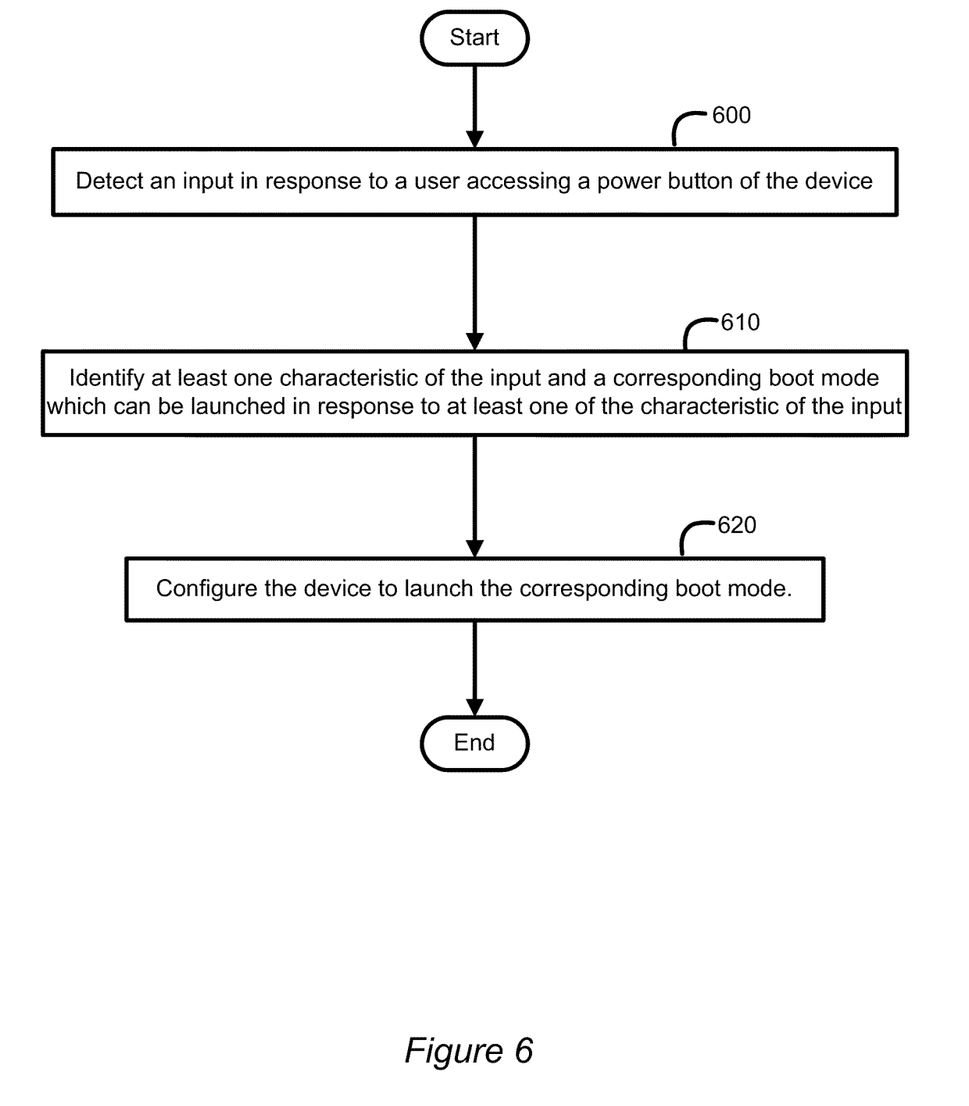
FIG. 6 is a flow chart illustrating a method for launching a boot mode according to an embodiment of the invention.

FIG. 6 is a flow chart illustrating a method for launching a boot mode according to an embodiment of the invention. The method of FIG. 6 uses a device with a power button, a processor, a communication channel, a storage device, a device application, and one or more boot modes. In other embodiments, the method of FIG. 6 uses additional components and/or devices in addition to and/or in lieu of those noted above and illustrated in FIGS. 1, 2, 3, 4, and 5.

As noted above, in one embodiment, the device application is a boot loader of the device configured by the processor to initially detect an input in response to a user accessing a power button of the device 600. The power button is a component of the device which a user can physically access by touching or pressing the power button. Additionally, the power button is coupled to a communication channel of the device and the power button sends one or more signals through the communication channel in response to a user accessing the power button.

The processor initially instructs the device application to scan and/or monitor the communication channel for one or more signals. If any signals are detected from the power button, the device application will identify the signals as inputs to the power button. The device application will then proceed to identify at least one characteristic of the input and a corresponding boot mode which can be launched in response to at least one of the characteristic of the input 610.

As noted above, at least one characteristic of the input can include a number of times the power button was accessed, a duration of one or more of the accesses, and/or a duration between one or more of the accesses. Further, when identifying at least one of the characteristic of the input, the device application will scan the communication channel and identify a number of signals from the power button, a duration of one or more of the signals, and/or a duration between one or more of the signals.

In one embodiment, the device application can further store at least one characteristic of the input or signal as a file. Utilizing at least one characteristic of the input, the device application will attempt to locate a boot mode which can be launched in response to at least one of the characteristics of the input. A boot mode can be launched if the boot mode includes criteria which match the characteristics of the input. As noted above, a boot mode is a mode of operation for the device. The device can include and load one or more boot modes onto the device. Further one or more of the boot modes can include a BIOS, a firmware update mode, and/or a diagnostic mode.

The device application will locally or remotely scan for any boot modes accessible to the device and identify listed characteristics of the boot modes. The device application will then compare the characteristics of the input the listed characteristics of the boot modes. In one embodiment, the device application additionally configures a display device to render a user interface for a user to interface with. The user interface can display one or more boot modes accessible by the device, as well as the characteristics associated with the boot modes.

Utilizing the listed characteristics associated with the boot modes, the user knows how many times and how long to access the power button in order to load the corresponding boot mode. In another embodiment, the device application can additionally identify one or more of the characteristics of the input to identify a command which can be executed if the user interface is rendered.

Once the device application has identified at least one characteristic of the input, the device application will attempt to identify a matching boot mode. If the device application finds a matching boot mode, the device application will identify the matching boot mode as a corresponding boot mode to be launched. The device application will then configure the device to launch the corresponding boot mode 620. When configuring the device to launch the corresponding boot mode, the device application accesses the corresponding boot mode and loads an image or file of the corresponding boot mode as a ROM for the device.

In one embodiment, once the corresponding boot mode has been loaded, the device application can continue to scan for the user accessing the power button and identify any signals detected from the power button as inputs of the power button. Additionally, the device application can identify one or more actionable items which can be executed while in the corresponding boot one.

In another embodiment, the device application additionally configures the display device to render the user interface to display one or more of the actionable items and instructions of how the user can navigate through the user interface and select one or more of the actionable items to be executed. The method is then complete. In other embodiments, the method of FIG. 6 includes additional steps in addition to and/or in lieu of those depicted in FIG. 6.

Figure 7:
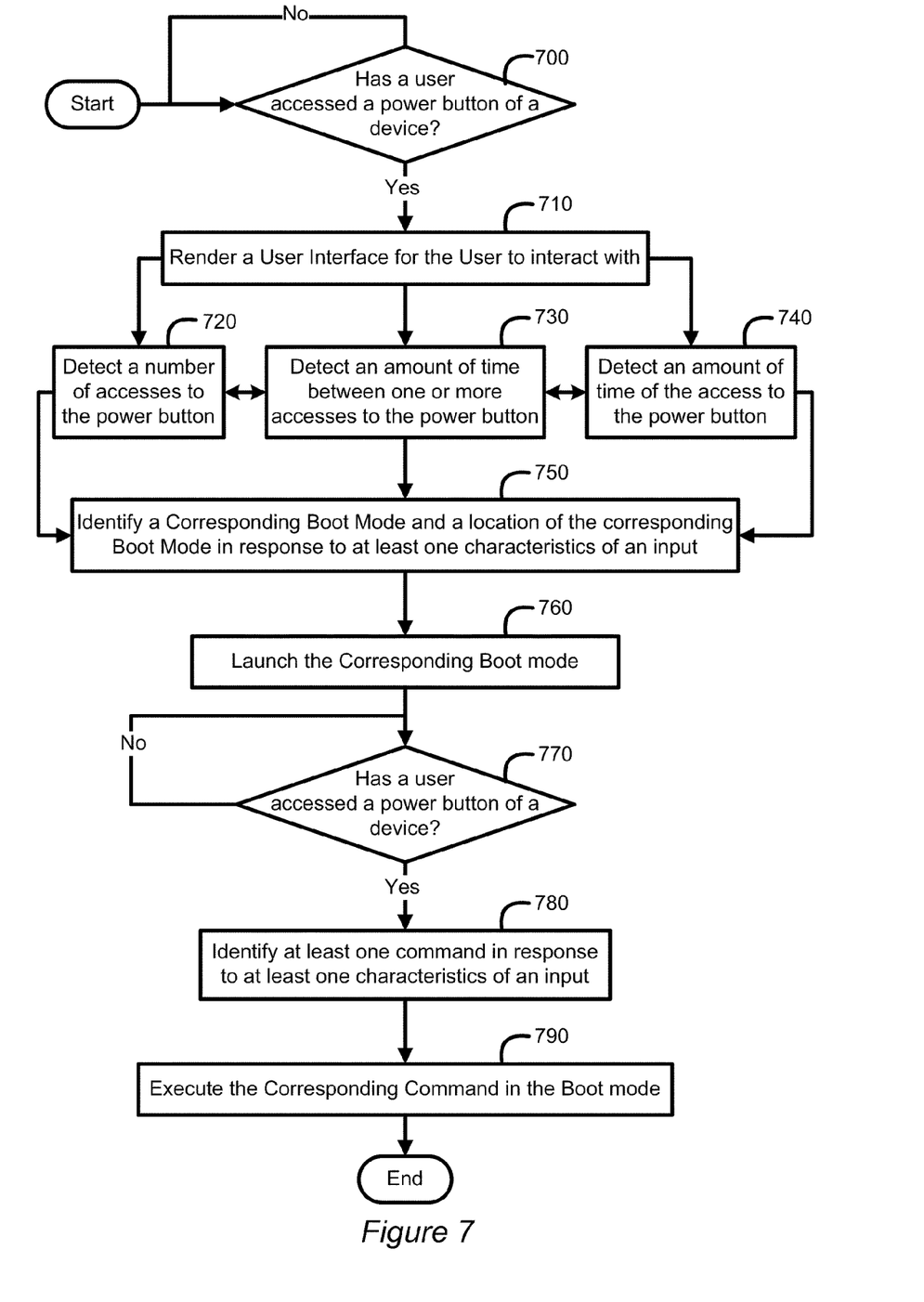
FIG. 7 is a flow chart illustrating a method for launching a boot mode according to another embodiment of the invention.

FIG. 7 is a flow chart illustrating a method for launching a boot mode according to another embodiment of the invention. Similar to the method of FIG. 6, the method of FIG. 7 uses a device with a power button, a processor, a communication channel, a storage device, a device application, and one or more boot modes. In other embodiments, the method of FIG. 7 uses additional components and/or devices in addition to and/or in lieu of those noted above and illustrated in FIGS. 1, 2, 3, 4, and 5.

As noted above, in one embodiment, in response to a user initially accessing the power button, the device can be powered on. The processor of the device will then send one or more instructions for the device application to scan the communication channel and determine whether a user has accessed the power button of the device 700. The user is any person who can access the power button by touching or pressing the power button. Further a signal is generated by the power button through the communication channel in response to a touch, press, or depress of the power button.

The device application will scan and/or monitor the communication channel for one or more signals from the power button. If no signal is detected, the device application will continue to determine whether a user has accessed the power button of the device 700. In another embodiment, if one or more signals are detected from the power button, the device application can access a display device coupled to the device and configure the device to render a user interface for the user to interact or interface with 710.

Further, the user interface can be configured to display one or more boot modes which are accessible to the device application or the device. In one embodiment, the user interface additionally displays characteristics associated with the boot modes. The characteristics can specify under what conditions a boot mode will be selected and launched by the device application.

In one embodiment, the characteristics can specify a number of times the power button is to be accessed, a duration of one or more of the accesses, and/or a duration between one or more of the accesses. Once the user interface has been rendered, the device application can proceed to identify at least one characteristic of one or more inputs by detecting a number of accesses to the power button 720, detecting an amount of time between one or more accesses to the power button 730, and/or detecting a duration of one or more accesses to the power button 740. Steps 720, 730, and 740 can be performed by the device application individually, sequentially, or in parallel.

Additionally, when detecting a number of accesses to the power button, an amount of time between one or more of the accesses, and a duration of one or more of the accesses, the device application can scan the communication channel for signals from the power button and identify a number of the signals from the power button, a duration of one or more of the signals, and a duration between one or more of the signals. Utilizing the signals from the power button, the device application can identify at least one characteristic of one or more inputs.

In response to identifying at least one characteristic of an input, the device application can proceed to identify a corresponding boot mode and a location of the corresponding boot mode to be loaded on the device 750. As noted above, at least one characteristic of an input can specify a location of a boot mode to be loaded. One or more characteristics of the input can be associated with a location of the boot mode. In one embodiment, if the power button is pressed once and help down for 5 seconds, the device application can determine that the user is instructing the device application to search a removable storage device for the boot mode.

Once one or more boot modes are found, the device application will identify one or more characteristics associated with the boot modes. The device application will then compare the characteristics of the input of the power button to the characteristics of the boot modes. If any of the boot modes have associated characteristics which match the characteristics of the input, the device application will identify the matching boot mode as a corresponding boot mode which can be loaded.

The device application will then proceed to launch the corresponding boot mode by accessing the boot mode and loading a file or image of the boot mode as a ROM for the device 760. As noted above, in one embodiment, once a corresponding boot mode has been loaded, the device application can continue to determine whether a user is accessing the power button of the device 770. If no signal is detected from the power button, the device application will continue to scan for the user accessing the power button.

If the device application detects one or more signals once the corresponding boot mode has been loaded, the device application will proceed to identify at least one command associated in response to one or more characteristics of the input 780. As noted above, a command can be associated with the corresponding boot mode which has been launched. Further, the command can include an instruction to load another corresponding boot mode.

In one embodiment, the device application additionally configures the display device to render a user interface while in the corresponding boot mode. The user interface can display one or more actionable items which can be executed while in the corresponding boot mode. If a user interface is being rendered, one or more of the commands can include an instruction to navigate through the user interface. Additionally, one or more of the commands can include an instruction to select and execute one or more actionable items available in the corresponding boot mode.

In response to identifying at least one command in response to at least one characteristic of the input, the device application will proceed to execute the corresponding command in the loaded boot mode 790. The method is then complete or the device application can continue to identify one or more characteristics of an input in response to a user accessing the power button. In other embodiments, the method of FIG. 7 includes additional steps in addition to and/or in lieu of those depicted in FIG. 7.

By detecting an input in response to a user accessing a power button of a device, at least one characteristic of the input can be identified. In response, a corresponding boot mode with characteristics which match the characteristics of the input can accurately be identified. As a result, a user friendly and efficient experience can be created for a user of the device when the device is launching one or more boot modes.

What is claimed is:

1. A method for launching a boot mode of a device comprising:
    detecting an input in response to a user accessing a power button of the device;
    identifying at least one characteristic of the input and a corresponding boot mode which can be launched in response to at least one of the characteristic of the input; and
    configuring the device to launch the corresponding boot mode;
    wherein the corresponding boot mode launched by the device is a firmware update mode stored as a ROM image on a storage device of the device, a location of the firmware update mode identified by the at least one characteristic of the input.

2. The method for launching a boot mode of claim 1 further comprising identifying at least one command utilizing at least one characteristic of an input.

3. The method for launching a boot mode of claim 2 wherein a command includes a navigation instruction for a user interface of the device.

4. The method for launching a hoot mode of claim 2 wherein a command includes a selection instruction for a user interface of the device.

5. The method for launching a boot mode of claim 1 wherein identifying at least one characteristic of the input includes detecting a number of times the user accesses the power button.

6. The method for launching a boot mode of claim 1 wherein identifying at least one characteristic of the input includes detecting an amount of time which the user is accessing the power button.

7. The method for launching a boot mode of claim 1 wherein identifying at least one characteristic of the input includes detecting an amount of time between one or more accesses of the power button by the user.

8. The method for launching a boot mode of claim 1 wherein the at least one characteristic of the input corresponds to at least one command associated with the boot mode, and the command further includes an instruction to load another hoot mode.

9. The method for launching a boot mode of claim 1 wherein a device application enables a user to select an actionable item to execute while in the firmware update mode.

10. A device comprising:
a processor;
a power button coupled to a communication channel of the device; and
a device application executable by the processor from a computer readable memory and configured to scan the communication channel for an input in response to a user accessing the power button and select a boot mode of the device to launch in response to identifying at least one characteristic of the input;
wherein one or more boot modes include a firmware update mode stored as a ROM image on a storage device of the device, a location of the firmware update mode identified by the at least one characteristic of the input.

11. The device of claim 10 wherein the device application is a boot loader configured to select a boot mode to launch from a storage device of the device.

12. The device of claim 11 further comprising a display device configured to render a user interface of the boot loader for the user to interface with.

13. The device of claim 11 wherein a boot mode includes a diagnostic mode of the device.

14. The device of claim 11 wherein a boot mode includes a BIOS of the device.

15. A computer-readable program in a non-transitory computer-readable medium COMPRISING:
a device application configured to detect an input and identify at least one characteristic of the input in response to a user accessing a power button of a device;
wherein the device application is additionally configured to identify a corresponding boot mode which is associated with at least one of the characteristic of the input; and
wherein the device application is further configured to instruct the device to launch the corresponding boot mode;
wherein the corresponding boot mode launched by the device is a firmware update mode stored as a ROM image on a storage device of the device, a location of the firmware update mode identified by the at least one characteristic of the input.

16. The computer-readable program in a non-transitory computer-readable medium of claim 15 wherein the device application configures continues to scan for at least one input from the user accessing the power button of the device in response to the corresponding boot mode being launched.

17. The computer-readable program in a non-transitory computer-readable medium of claim 16 wherein the device application is further configured to identify at least one characteristic of the input and a corresponding command which can be executed in the corresponding boot mode.

18. The computer-readable program in a non-transitory computer-readable medium of claim 17 wherein the corresponding command includes an instruction to select and launch another corresponding boot mode associated with at least one characteristic of the input.

19. The computer-readable program in a non-transitory computer-readable medium of claim 17 wherein the at least one characteristic of the input corresponds to at least one command associated with the boat mode, and the same at least one command further includes an instruction to load another boot mode.

20. The computer-readable program in a non-transitory computer-readable medium of claim 17 wherein a device application continues to scan for a user accessing a power button, and the device application identifies at least one actionable item to execute while already in a corresponding boot mode.

* * * * *

UNITED STATES PATENT AND TRADEMARK OFFICE
CERTIFICATE OF CORRECTION

Page 1 of 1

PATENT NO.        : 8,725,996 B2
APPLICATION NO.   : 12/787976
DATED             : May 13, 2014
INVENTOR(S)       : Timothy J. Freese et al.

It is certified that error appears in the above-identified patent and that said Letters Patent is hereby corrected as shown below:

In the Claims

In column 10, line 51, in Claim 4, delete "hoot" and insert -- boot --, therefor.

In column 11, line 3, in Claim 8, delete "hoot" and insert -- boot --, therefor.

In column 11, line 31, in Claim 15, delete "COMPRISING:" and insert -- comprising: --, therefor.

Signed and Sealed this
Twelfth Day of August, 2014

Michelle K. Lee
*Deputy Director of the United States Patent and Trademark Office*